United States Patent
Saxena et al.

(10) Patent No.: US 11,928,239 B2
(45) Date of Patent: Mar. 12, 2024

(54) SENSITIVE DATA MANAGEMENT SYSTEM

(71) Applicant: SAP SE, Walldorf (DE)

(72) Inventors: Setu Saxena, Copenhagen (DK); Akhilesh Kumar, Walldorf (DE)

(73) Assignee: SAP SE, Walldorf (DE)

( * ) Notice: Subject to any disclaimer, the term of this patent is extended or adjusted under 35 U.S.C. 154(b) by 327 days.

(21) Appl. No.: 17/490,112

(22) Filed: Sep. 30, 2021

(65) Prior Publication Data
US 2023/0114138 A1    Apr. 13, 2023

(51) Int. Cl.
| | |
|---|---|
| G06F 21/62 | (2013.01) |
| G06F 16/953 | (2019.01) |
| G06F 21/71 | (2013.01) |
| H04L 9/40 | (2022.01) |
| G06F 21/44 | (2013.01) |

(52) U.S. Cl.
CPC ........ G06F 21/6245 (2013.01); G06F 16/953 (2019.01); H04L 63/102 (2013.01)

(58) Field of Classification Search
None
See application file for complete search history.

(56) References Cited

U.S. PATENT DOCUMENTS

| | | | |
|---|---|---|---|
| 8,856,295 B2 | 10/2014 | Aliminati | |
| 9,197,498 B2 | 11/2015 | Chambers et al. | |
| 9,292,405 B2 | 3/2016 | Wankawala et al. | |
| 10,454,940 B2 | 10/2019 | Lander et al. | |
| 10,460,122 B1 * | 10/2019 | Kirby | H04L 63/101 |
| 10,803,167 B1 | 10/2020 | Stanev et al. | |
| 11,233,776 B1 * | 1/2022 | Muddapappu | H04L 63/102 |
| 2005/0044246 A1 * | 2/2005 | Kawabata | H04L 63/101 |
| | | | 709/215 |

(Continued)

OTHER PUBLICATIONS

"Deployment in the Intranet or on the Internet", printed Sep. 29, 2021, from Internet at https://help.sap.com/viewer/0a236c1f1d9b4bbd83fded76c190ee21/7.52/en-US/45e95b8d0abb42828bd92ed35e64b7d7.html, 2 pages.

(Continued)

*Primary Examiner* — Venkat Perungavoor
(74) *Attorney, Agent, or Firm* — Sterne, Kessler, Goldstein & Fox P.L.L.C.

(57) ABSTRACT

Disclosed herein are various embodiments for a sensitive data management system. An embodiment operates by receiving an HTTP request for an interface. A plurality of tiles, including both tiles associated with sensitive data and non-sensitive data, are identified for display on the interface. An access profile associated with providing access to the sensitive data is identified, the access profile including one or more requirements, associated with the HTTP request. Request information in the HTTP request corresponding to the one or more requirements of the access profile is identified. The identified request information is compared to the one more requirements of the access profile. A determination is made whether the identified request information satisfies the one more requirements of the access profile based on the comparing. At least one of: the second tile or the first tile and the second tile are provided for display on the interface based on the determination.

20 Claims, 4 Drawing Sheets

(56) References Cited

U.S. PATENT DOCUMENTS

| | | | |
|---|---|---|---|
| 2007/0198713 A1* | 8/2007 | Tsao | H04L 45/04 709/225 |
| 2008/0184228 A1* | 7/2008 | Tsao | H04L 67/06 718/1 |
| 2015/0032587 A1 | 1/2015 | Broom et al. | |
| 2017/0344218 A1 | 11/2017 | Jann et al. | |

OTHER PUBLICATIONS

"SharePoint—the mobile and intelligent intranet," May 4, 2016, from Internet at https://www.microsoft.com/en-gb/microsoft-365/blog/2016/05/04/sharepoint-the-mobile-and-intelligent-intranet/, 8 pages.

* cited by examiner

SENSITIVE DATA MANAGEMENT SYSTEM

BACKGROUND

It is often helpful for users to have access to the same functionality and same interface when accessing a system from different devices. However this uniformity also creates security issues for any sensitive data that may be accessible from the interface. For example, if an unknown device from outside of a known network is provided access to sensitive data through the interface, this access may increase the likelihood of exposing the sensitive data to a hacker or other unauthorized user who may be operating the unknown device or have access to the outside network.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

It is often helpful for users to have access to the same functionality and same interface when accessing a system from different devices. However this uniformity also creates security issues for any sensitive data that may be accessible from the interface. For example, if an unknown device from outside of a known network is provided access to sensitive data through the interface, this access may increase the likelihood of exposing the sensitive data to a hacker or other unauthorized user who may be operating the unknown device or have access to the outside network.

Figure 1:
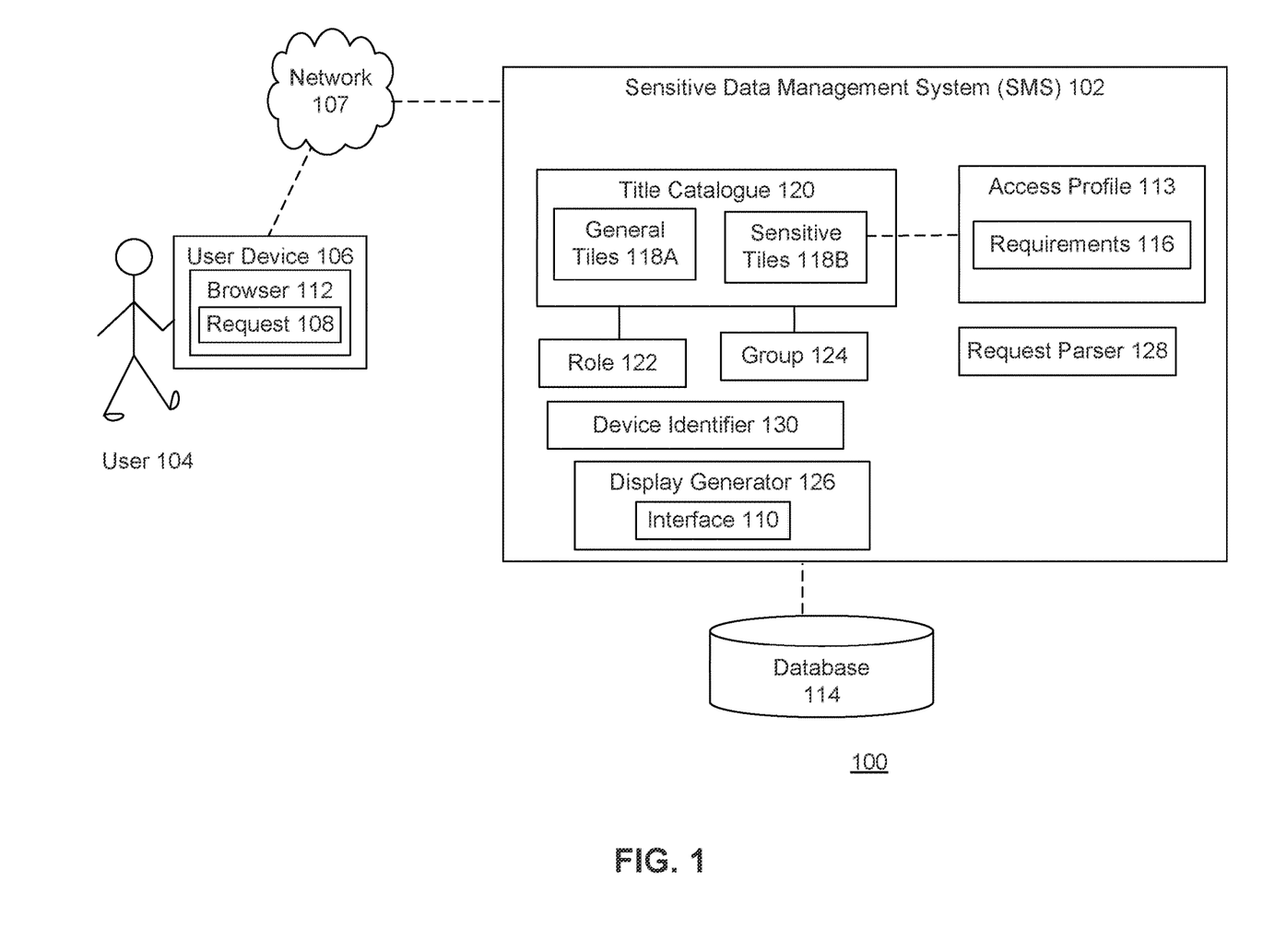
FIG. 1 is a block diagram illustrating functionality for a sensitive data management system (SMS), according to some example embodiments.

FIG. 1 is a block diagram 100 illustrating functionality for a sensitive data management system (SMS) 102, according to some example embodiments. SMS 102 may secure sensitive data and prevent sensitive data from being exposed to unauthorized users, such as hackers.

In some embodiments, a user 104 may operate a user device 106 to request 108 access to an interface 110. The user device 106 may include any computing device, such as a mobile phone, laptop, tablet, desktop computer, or any SMART or Internet of Things (IoT) device. The request 108 may identify one or more files, documents, or webpages being requested, and may also include information about the user 104, user device 106, browser 112, and/or network 107. In some embodiments, request 108 may include a request to login to a particular system (e.g., such as a corporate enterprise system), account (e.g., such as a financial account), or program (e.g., such as email) over the Internet.

In some embodiments, the request 108 may be made via a browser 112 accessible from user device 106. In some embodiments, browser 112 may be any program that is used to view or access data or files. Example browsers 112 include an internet or web browser, a mobile app, or other program through which a user 104 may view and interact with interface 110. Interface 110 may include any user interface provided to user device 106 responsive to request 108.

In some embodiments, request 108 may be any request for a file or document made via a browser 112, such as a hypertext transfer protocol (HTTP) request or a file transfer protocol (FTP) request. As used herein, the terms request, FTP request, and HTTP request may be used interchangeably. An HTTP request 108, as is used by web browsers 112 in requesting webpages or documents, may be an electronic communication that is used to request access to and retrieve or receive various webpages or other documents for viewing, editing, or other performing other interactions. In some embodiments, interface 110 may enable a user 104 to create new files or create new data to be stored in database 114.

In some embodiments, request 108 may include a request to access a system that hosts various applications or apps, such as SAP Fiori Launchpad, which in some embodiments may be organized or use SAP Fiori Cache.

In some embodiments, an HTTP request 108 may begin with a known set of characters in a known format, such as "http://" or "https://". The HTTP request 108 may also include a string of characters or variables that may both direct the request to the appropriate server or other computing device (e.g., identifying the requested document(s)) and/or provide enough information to the receiving server to process and respond to the request 108 (e.g., such as login credentials or the devices, programs, and/or networks from which the request 108 is originating). For example, request 108 may identify which user 104, user device 106, and/or browser 112 is originating or making the request 108, as well as what document(s) is being requested.

In some embodiments, request 108 may include information about an originating and/or any intervening networks 107 or network devices over which the request 108 passes from user device 106 before arriving at SMS 102. In some embodiments, request 108 may include user or login credentials (e.g., username, password, biometrics, user roles) and/or other user identification or authentication information.

As just noted, the string of characters of request 108 may include various features or properties of the user device 106, browser 112, and/or network 107 from which the request 108 is generated. Example features or properties that may be included in request 108 include, but are not limited to, a time/date of the request 108, timezone, geographic location, browser type (including version number), operating system (including version), firmware (including version number), type of device (e.g., mobile phone, laptop, manufacturer, model number), userid, password, and language (e.g., English, French, German, etc.).

SMS 102 may receive and process request 108, arranging and returning an appropriate interface 110 configured based on security concerns or authorization for accessing the requested information or functionality. For example, SMS 102 may analyze or evaluate the properties, features, variables and other information included in the HTTP request 108 to determine to which types of functionality and/or data of database 114 the user device 106 is and/or is not authorized to access from interface 110. A display generator 126 may then generate, include, remove, or arrange the elements of interface 110 accordingly.

In some embodiments, these properties of request 108 may be used to determine to which display elements, features, information, functionality, or tiles (as will be described in greater detail below), the requesting user device 106 has access. SMS 102 may then configure interface 110 accordingly, adding, removing, blocking, greying, or otherwise modifying the information or functionality accessible from interface 110. As such, the same user 104, with the same userid/password or other login credentials, may see two different interfaces 110 (with access to different data or functionality) for accessing the same system, account, or program, depending on from what user device 106, browser 112, and/or network 107 the request 108 is received.

Network 107 may include any computing, or telecommunications network to which the user device 106 is connected and may be used to exchange information with other computing devices (e.g., over the Internet). In some embodiments, various features or properties of network 107 may be included in request 108. Examples network properties that may be included in request 108 include, but are not limited to, network name, security level (e.g., public or private network indicator, encryption protocol), and the internet protocol (IP) addresses of one or more servers of the network 107. In some embodiments, request 108 may include information about any intervening networks 107 through which request 108 travels on its way to SMS 102.

SMS 102 may parse the request 108 to extract information that may be used to determine if the set requirements 116 for accessing sensitive data or sensitive tiles 118B have been satisfied. Requirements 116 that are not satisfied by the information of request 108 may result in SMS 102 limiting or blocking access to various data and/or functionality in interface 110. The various information and/or functionality presented via interface 110 is referred to herein as tiles, but is not limited to a tiled interface 110. Other interfaces 110 may include windows, tabs, or other visual arrangements, including, but not limited to tiles.

Based on the comparison of the information extracted from request 108 to requirements for accessing sensitive tiles 118B, SMS 102 may determine what tiles (e.g., functionality, information, display elements, and/or features) to enable/disable or include/remove from interface 110.

In some embodiments, SMS 102 may determine what information of a database 114 the user 104 can or cannot access from interface 110 using user device 106. In performing request processing, SMS 102 may hide, protect, limit, or restrict/remove access to sensitive data in database 114 from being accessed through an interface 110 from any (untrusted) devices that do not satisfy a set of one or more requirements 116. In some embodiments, is requirement 116 is not satisfied, read/write access to data may be limited to read only access.

SMS 102 may generate different versions of an interface 110 for the same user 104, depending on the information included in request 108 which may identify the user device 106, network 107, and/or browser 112 information, as well as any user credentials that may be required. SMS 102 may protect sensitive data from being provided to an untrusted, unknown, or unsecure device 106 and/or from being transmit over an untrusted, unknown, or unsecure network 107 as determined based on the information provided via request 108.

Figure 4:
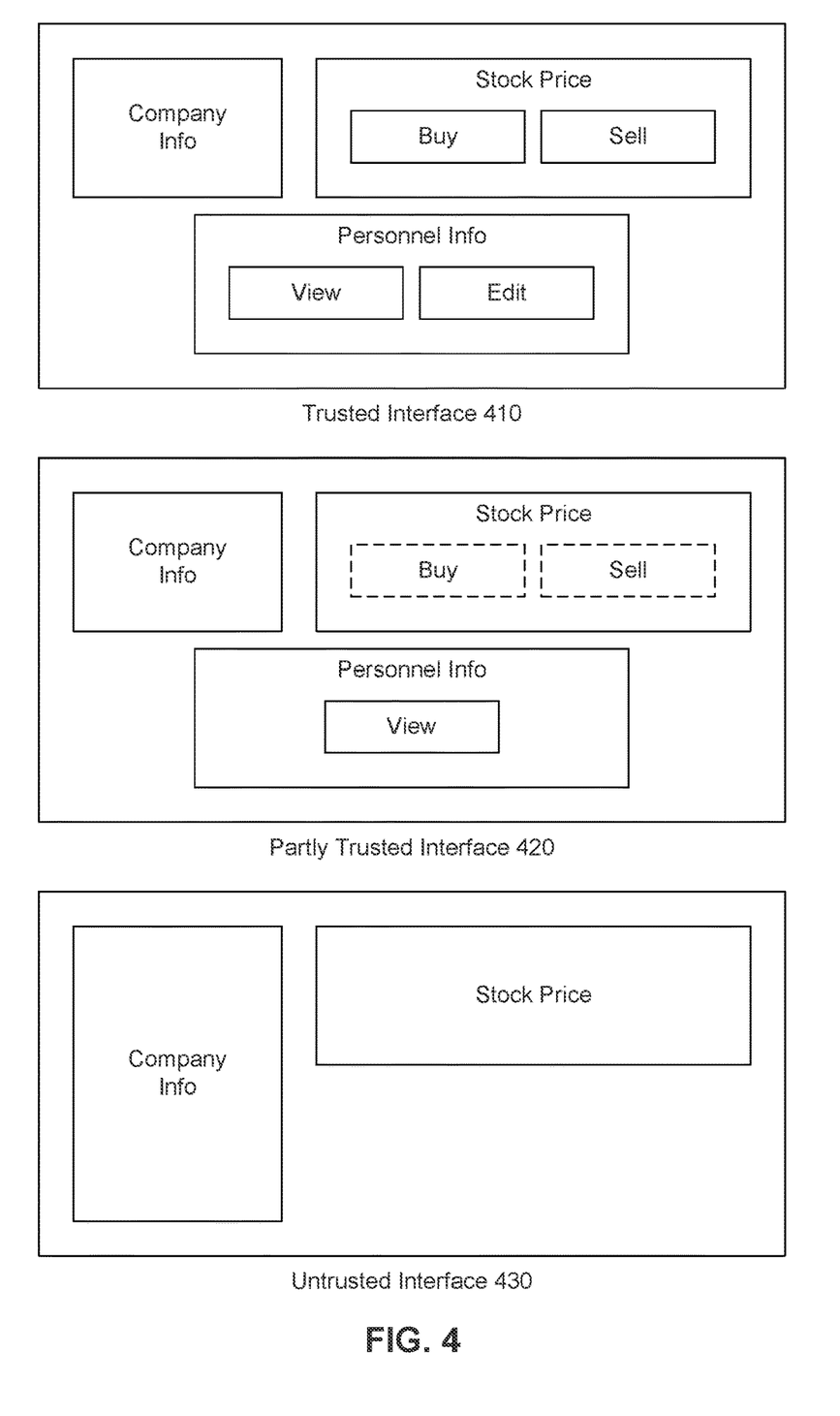
FIG. 4 illustrates several example interfaces that may be generated by SMS, according to some embodiments.

FIG. 4 illustrates several example interfaces 410, 420, 430 that may be generated by SMS 102, according to some embodiments. FIG. 4 illustrates three different versions (410, 420, 430) of an interface 110 for a particular system from the same user. SMS 102 may compare the information extracted from three different requests 108 (from the same user 104) to the various requirements 116 to determine how to arrange (e.g., to which tiles, data, or functionality to provide access via) the various interfaces 410, 420, 430.

Trusted interface 410 illustrates an example interface that is configured for a request 108 that satisfies all the requirements 116 for accessing sensitive data or sensitive tiles 118B. For example, the trusted device may be a device for which the requesting IP address or MAC address has been included on a whitelist at SMS 102. Or for example, the request 108 may be made from a trusted or known network 107.

Trusted interface 410 may provide general company information (e.g., general tile 118A), stock price information (e.g., general tile 118A), buy/sell functionality for a stock (e.g., sensitive tile 118B), personnel info (e.g., sensitive tile 118B) and view/edit functionality for the personnel info (e.g., sensitive tiles 118B).

Partly trusted interface 420 illustrates an example interface that is configured for a request 108 that may satisfy some subset of requirements 116. For example, the request 108 may indicate a known device 106 from an unknown or untrusted network 107, or a known device 106 using a particular or less trusted/untrusted type of browser 112 (e.g., relative to another browser 112 that is trusted to which full access may be granted).

As illustrated, the Buy and Sell functionality/tiles may be greyed out and inaccessible from partly trusted interface 410, and the user may only have access to view functionality for personnel information, where the edit functionality has been removed from the interface 420.

The untrusted interface 430 illustrates an example interface that is may be configured responsive to a request 108 in which requirements 116 are not satisfied. For example, the request 108 may have been received from an unknown device and an unknown network.

As illustrated in untrusted interface 430, the company info tile may be enlarged because there is more screen space available, since the personnel info tile has been completely removed or hidden. Further, the functionality related to stock price (e.g., buy and sell) have been removed as well.

All three interfaces 410, 420, 430 are example variations of how SMS 102 may protect data, even when the requests 108 are received from the same user or the same login credentials. In some embodiments, the interfaces 410, 420, 430 may be variations that are provided to the same user operating the same device 106, but from different networks 107 and/or different browsers 112.

Returning to FIG. 1, in some embodiments, interface 110 may include or display a variety of tiles that are used to provide functionality for accessing or modifying information from database 114. There may be different types of tiles, including both general tiles 118A and/or sensitive tiles 118B, which are both referred to herein generally as tiles 118.

Tiles 118 may include any displayable user interface element or component, including, but not limited to, charts, graphs, text, text boxes, drop down boxes, check boxes, etc. In some embodiments, tiles 118 may include and display data retrieved from database 114 and/or functionality that allows (read/write/modify/delete) access to data from database 114. In some embodiments, requirements 116 may correspond to different functionality (e.g., read/write/modify/delete) of data.

Database 114 may include any data storage system accessible over a private network or a public network such as the Internet. Tiles 118 may be selected or generated specifically for whatever user 104 (e.g., as determined based on a userid or login credentials) is logging in to the system or otherwise requesting interface 110 via request 108.

For example, if an employee logs in with a request 108 for interface 110, the interface 110 may populated with tiles 118 that the employee uses most frequently or to which the employee is most likely to need access based on the employee's role or type of account. Example tiles 118 may include access to financial functions, salary data, or vacation data. The tiles 118 may also include tiles 118 related to various projects or tasks that the employee is working on or other general tiles 118 that may be provided to all employees (e.g., such as company history or holiday information).

In some embodiments, there may be different types or categories of tiles based on the sensitivity or confidentiality of the information accessible (from database 114) via the tile 118. For the sake of simplicity, the illustrated tiles 118 are only divided into two different types of tiles, general tiles 118A and sensitive tiles 118B. It is understood that in other embodiments, more or different classes of tiles may exist.

In the example of FIG. 1, general tiles 118A may include tiles or user interface components that are accessing general or non-sensitive data from database 114. Sensitive tiles 118B may include any tiles or user interface components that are accessing any information from database 114 deemed, marked, or categorized as sensitive, private, secret, or confidential. Sensitive data may include any data for which increased permissions or security may be required. In some embodiments, data may be deemed sensitive based on which client or project is associated with the data. In some embodiments, SMS 102 may allow for various restrictions or requirements 116 to be defined to allow or deny access to sensitive data via sensitive tiles 118B.

In some embodiments, SMS 102 may include or have access to a tile catalogue 120. Tile catalogue 120 may be a list of all tiles 118 available across a number of users or to a particular user 104, and may include both general tiles 118A and sensitive tiles 118B. Different users 104 may have access to different sets of tiles 118 via tile catalogue 120.

In some embodiments, tile catalogue 120 may include hundreds or even thousands of tiles 118 that may be selected for display on a user interface 110. However, as it may be appreciated, displaying that many tiles on an interface 110 at the same time could clutter the interface 110 or otherwise make interface 110 difficult to use. As such, the tiles 118 of tile catalogue 120 may be subdivided or organized into various sets based on a designation of a role 122 and/or group 124. In some embodiments, a particular user account (corresponding to the login credentials or userid of user 104) may include a role 122 or group 124 designation includes a set of one or more tiles 118.

In some embodiments, user 104 may select or be assigned one or more roles 122. Role 122 may indicate a position or set of responsibilities within a company or other organization. Each role 122 may have its own set of tiles 118 that are related to performing the functions of that role 122, and which may access particular information from database 114 necessary for performing the functions of that role 122.

For example, an engineer role may include a first set of tiles 118 with access to a first set of information from database 114, while a salesperson role has a second set of tiles 118 with access to a second set of information from the same or a different database 114, and a human resources role may include a third set of tiles 118 with access to a third set of information from the same or a different database 114. In some embodiments, a user 104 may be assigned or select multiple roles 122.

Group 124 may include any categorization, organization, or grouping of tiles 118. In some embodiments, group 124 may include a grouping of tiles 118 associated with a role 122.

For example, engineering tiles may be grouped together. In some embodiments, group 124 may correspond to one or more products, tasks, or projects on which a user 104 is working. For example, engineering tiles associated with automobile manufacturing may in a first group, engineering tiles associated with boat manufacturing may in a second group, and tiles corresponding to a project or client X may be in third group. In some embodiments, user 104 may select and arrange any tiles 118 (which the user 104 is authorized to access) from tile catalogue 120 and arrange or group them in any way that the user 104 desires.

In some embodiments, a display generator 126 may identify the roles 122 and/or groups 124 associated with an account of the user 104, and arrange the tiles 118 (corresponding to the role 122 and/or group 124) on the user interface 110 into various blocks, menus, tabs, sections, etc. A user 104 may also visually rearrange or regroup tiles via the interface 110 and those changes may be saved and persisted for the next time the user 104 requests 108 interface 110.

Generally speaking, in many systems, the same interface may be accessible to the same user across different devices, being accessed from different networks, around the world. However, as noted above, providing uniform access to an identical user interface 110 may unnecessarily expose sensitive data from a database to risks that may compromise the secrecy, security, confidentiality, or integrity of the data. As such, SMS 102 may enable an administrator or user 104 to generate an access profile 113 that includes various requirements 116 that must be satisfied to display or provide access to sensitive tiles 118B or particular functionality which may provide access to read, modify, add, and/or delete sensitive data across one or more databases 114.

In some embodiments, database 114 may designate or include metadata that designates certain information as confidential, secret, private, or sensitive data. Examples of confidential or sensitive data may include salary, benefits, or financial information, social security numbers, addresses, family information, or health information. Other example of sensitive data may include data related to particular customers or projects, or industries (e.g., defense department contracts, etc.). In some embodiments, a user 104 may designate certain tiles 118 or information as being sensitive or confidential.

Any tiles 118 that access (read/write) sensitive or confidential data from database 114 or that were otherwise marked or designated as sensitive/confidential may be indicated as sensitive tiles 118B. A user 104 or administrator may then create a set of requirements 116 in an access profile 113 for accessing sensitive tiles 118B or sensitive/confidential data via interface 110.

An access profile 113 may be a grouping of one or more requirements 116 for accessing sensitive data via one or more sensitive tiles 118B. In some embodiments there may be varying levels of sensitivity or confidentiality. For example, in addition to general tiles 118A and sensitive tiles 118B, in another embodiment, tiles 118 may also include a grouping of top secret tiles that includes its own requirements 116 and access profile 113 separate from the secret tiles 118B. Or, for example, secret tiles 118B may be grouped into various groups (e.g., group A, group B, group C), and each group may have its own access profile 113 and requirements 116.

In some embodiments, a first group of secret tiles 118B may inherent the access profile 113 and/or one or more requirements 116 from a second group of secrete tiles 118B. For example, the access profile 113 for the top secret tiles may require that the requirements 116 of the access profile for the secret tiles 118B is satisfied (e.g., top secret access profile 113 may include a reference such as a pointer to the secret access profile 113). The top secret access profile 113 may also include one or more different or additional requirements 116 from the requirements 116 of the secret access profile 113.

Requirements 116 may indicate what information needs to be included in request 108 (or cannot be included in request 108) in order to display or otherwise provide access to one or more sensitive tiles 118B on interface 110. As noted above, request 108 may be an HTTP request that includes various attributes or information about the source of the request 108. Example information that may be included in an HTTP include, but is not limited to, a time/date, timezone, location, browser type (including version number), operating system, type of device, userid, password, language, IP address, MAC address, and network information. The requirements 116 may be based on any of the information accessible from or included in the HTTP request 108.

In some embodiments, an access profile 113 may be a white list, indicating what requirements 116 are necessary to display or provide access to a particular sensitive tile 118B. For example, requirements 116 may indicate that only requests originating in Virginia, between 10:00 am-12:00 pm will be authorized for a particular sensitive tile 118B. Then for example, any requests 108 that are not received from Virginia between 10 am-12 pm are not provided access to sensitive tiles 118B.

In some embodiments, an access profile 113 may be a black list, indicating what requirements 116 if present in request 108, are denied access to a particular sensitive tile 118B. For example, requirements 116 may indicate that any requests 108 with the language set as "Russian" are denied access to one or more sensitive tiles 118B.

A request parser 128 may parse request 108 based on requirements 116 to determine what tiles 118 are provided or made accessible to display generator 126 to arrange and make available via interface 110. Request parser 128 may extract information from request 108, normalize and/or compare the extracted information to the requirements 116 of any access profiles 112 relevant to the tiles 118, roles 122, and/or groups 124 associated with the user 104 to determine what tiles 118A, 118B are accessible responsive to the request 108. In some embodiments, request parser 128 may mark or otherwise make the allowable tiles 118A, 118B (belonging to role(s) 122 and/or group(s) 124 associated with an account of the user 104) accessible to display generator 126.

Display generator 126 may then arrange the allowable tiles 118A, 118B on an interface 110 in a default, known, or previously saved displayed format. In some embodiments, sensitive tiles 118B for which the requirements 116 have not be satisfied may be greyed out (which cannot be selected) or completely removed from interface 110. In some embodiments, a greyed out tile 118 may indicate the reason why the tile 118 is greyed out (e.g., did not meet requirements 116, or did not meet language requirement 116).

In some embodiments, a tile 118 may include both general information (such as the price of a particular stock) and sensitive information or functionality (such as the ability to purchase/sell the stock, or how many shares are currently owned). If the requirements 116 of an access profile 113 corresponding to the tile 118 is not satisfied, the sensitive functionality or data may be blacked out or made inaccessible, while the general information such as stock price may be visible (and may automatically refresh if the tile 118 is configured to automatically refresh the stock price when it changes). An example of this is illustrated in FIG. 4. In other embodiments, the entire tile 118 may be blacked out, greyed out, or completely removed from the interface 110.

In some embodiments, request parser 128 may remove inaccessible tiles 118 from the tile catalogue 120 accessible from interface 110. For example, a finance tile may not be part of role 122 or group 124, and may be rarely used, so may not be displayed on user interface 110. However, interface 110 may allow a user 104 to search for tiles 118 from tile catalogue 120. As such there may be searchable and/or selectable tiles from tile catalogue 120 that are not displayed on interface 110.

In some embodiments, to save processing resources, SMS 102 may wait until a search is performed for additional tiles 118 (which may be part of tile catalogue 120 but not currently displayed on interface 110) prior to performing a requirements 116 analysis on any sensitive tiles 118B that may not be currently displayed or accessible via interface 110. Then, for example, when a search for tiles related to "money" is performed, the finance tile which may be marked as a sensitive tile 118B may be marked as inaccessible and may not appear in the search results or may otherwise be greyed out if requirements 116 for the finance tile are not satisfied. In some embodiments, the requirements analysis described herein may be performed during runtime.

In some embodiments, a device identifier 130 may be used to identify whether the request 108 has originated from a safe or trusted device. A trusted device may be any device that satisfies one or more safe device requirements. Some examples of trusted device requirements may be the presence of a cookie in a browser 112, a request originating from any of a set of one or more known, safe/trusted, or verified IP (internet protocol) addresses or MAC (media access control) addresses. For example, when SMS 102 receives request 108, device identifier 130 may first determine whether or not the request 108 has originated from a trusted device. If the request 108 has originated from a trusted device and/or from a trusted network 107, then the tiles 118 from tile catalogue 120 may be selected and arranged in interface 110 without performing any additional requirements 116 or access profile 113 checks or analysis no matter which sensitive tiles 118B are included in interface 110.

However, if device identifier 130, determines that the request did not originate from a trusted device or trusted network, then the various tiles associated with the profile of user 104 may be identified, access profiles 112 and requirements 116 may be checked against request 108, and only the allowed tiles 118 may be arranged in interface 110 which is then made accessible to user device 106 through browser 112.

Figure 2:
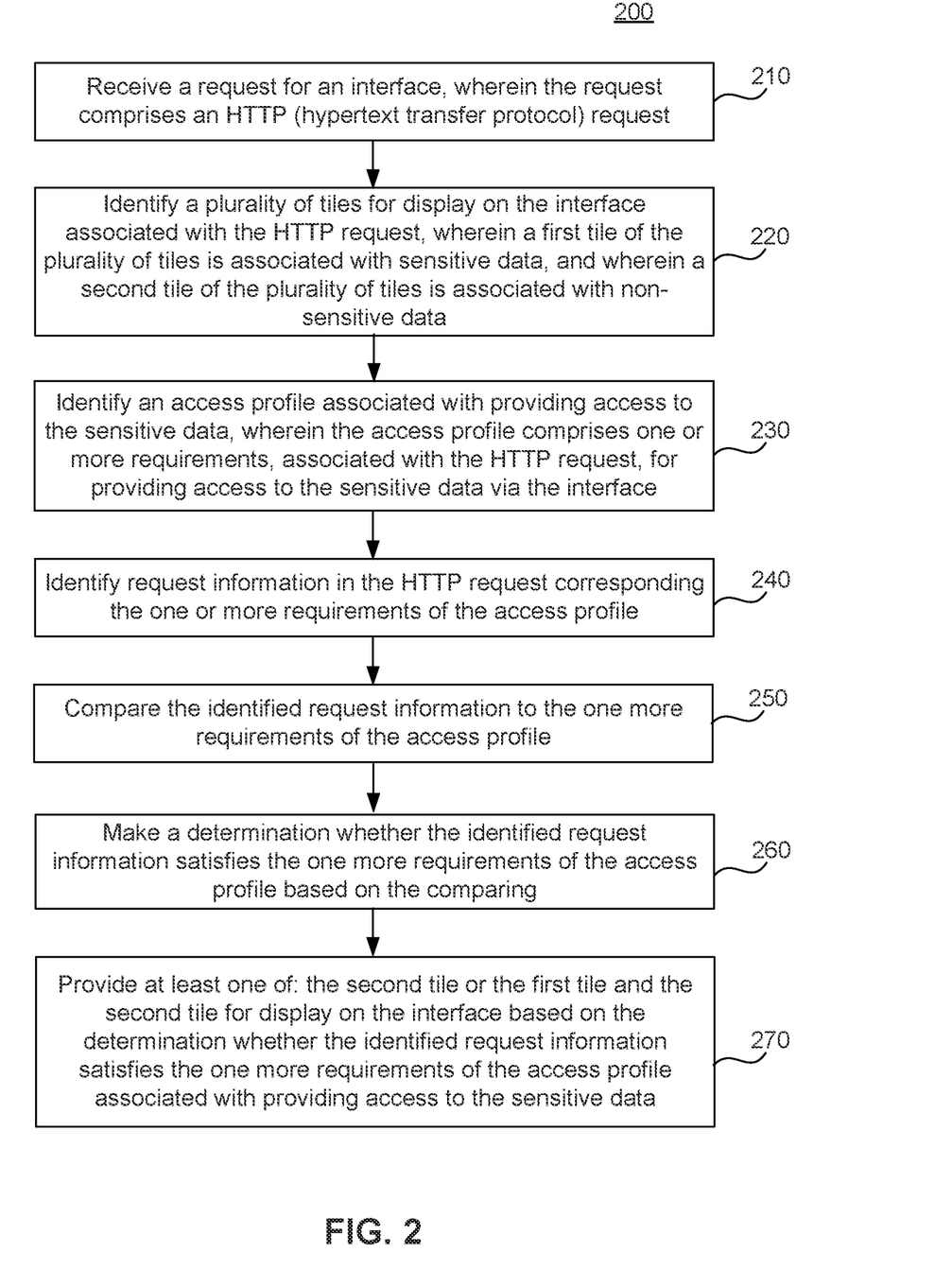
FIG. 2 is a flowchart illustrating example operations for functionality related to a sensitive data management system (SMS), according to some embodiments.

FIG. 2 is a flowchart 200 illustrating example operations for functionality related to a sensitive data management system (SMS) 102, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art. Method 200 shall be described with reference to the figures.

In 210, a request for an interface is received, wherein the request comprises an HTTP (hypertext transfer protocol) request. For example, SMS may receive an HTTP request 108 from a browser 112 operating on user device 106. The request 108 may be to access a particular file, program, application, webpage, or data.

In 220, a plurality of tiles are identified for display on the interface associated with the HTTP request, wherein a first tile of the plurality of tiles is associated with sensitive data, and wherein a second tile of the plurality of tiles is associated with non-sensitive data. For example, the interface 110 may include a variety of tiles 118 that can be displayed, including both general tiles 118A and sensitive tiles 118B. Sensitive tiles 118B may provide access to confidential or sensitive data, and general tiles 118A may provide access to any data not marked confidential or sensitive in database 114.

In 230, an access profile associated with providing access to the sensitive data is identified, wherein the access profile comprises one or more requirements, associated with the HTTP request, for providing access to the sensitive data via the interface. For example, SMS 102 may determine that an account of user 104 is associated with one or more roles 122 and/or includes one or more groups 124 of tiles 118, including at least one sensitive tile 118B. For the sensitive tiles 118B, SMS 102 may identify a corresponding access profile 113 with its own set of requirements 116 that are to be satisfied to include, display, or provide access to the sensitive tile 118B on the interface 110.

In 240, request information in the HTTP request corresponding to the one or more requirements of the access profile is identified. For example, request parser 128 may identify any information from request 108 that needs to be checked against requirements 116.

In 250, the identified request information is compared to the one more requirements of the access profile. For example, request parser 128 may compare the variable information about user 104, user device 106, browser 112, and/or network 107 included in request 108 against requirements 116 to determine whether requirements 116 for accessing the sensitive tiles 118B has bene satisfied.

In 260, a determination is made whether the identified request information satisfies the one more requirements of the access profile based on the comparing. For example, if request parser 128 determines that requirements 116 are satisfied, then the secret tiles 118B may be allowed to be provided for display on interface 110. However, if request parser 128 determines that requirements 116 are not satisfied, then the secret tiles 118B may be not allowed to be provided for display on interface 110.

In 270, at least one of: the second tile or the first tile and the second tile are provided for display on the interface based on the determination whether the identified request information satisfies the one more requirements of the access profile associated with providing access to the sensitive data. For example, display generator 126 may visually arrange the general tiles 118 and/or secret tiles 118B on interface 110 and provide access to interface 110 for display and usage through browser 112 of user device 106, responsive to request 108.

Figure 3:
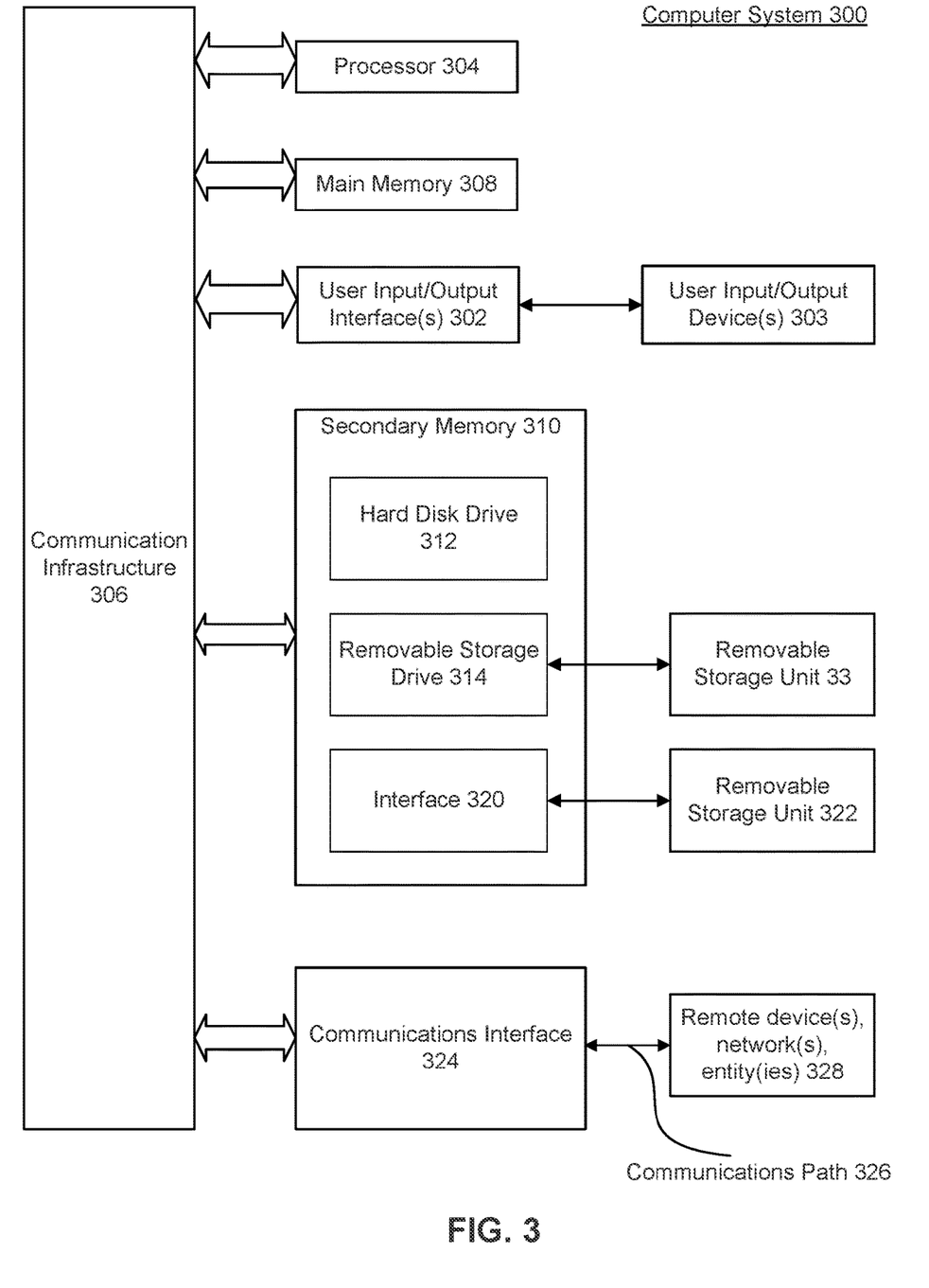
FIG. 3 is an example computer system useful for implementing various embodiments.

Various embodiments may be implemented, for example, using one or more well-known computer systems, such as computer system 300 shown in FIG. 3. One or more computer systems 300 may be used, for example, to implement any of the embodiments discussed herein, as well as combinations and sub-combinations thereof.

Computer system 300 may include one or more processors (also called central processing units, or CPUs), such as a processor 304. Processor 304 may be connected to a communication infrastructure or bus 306.

Computer system 300 may also include customer input/output device(s) 303, such as monitors, keyboards, pointing devices, etc., which may communicate with communication infrastructure 306 through customer input/output interface(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 may also include a main or primary memory 308, such as random-access memory (RAM). Main memory 308 may include one or more levels of cache. Main memory 308 may have stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 may include a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 may read from and/or write to removable storage unit 318.

Secondary memory 310 may include other means, devices, components, instrumentalities or other approaches for allowing computer programs and/or other instructions and/or data to be accessed by computer system 300. Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 may enable computer system 300 to communicate and interact with any combination of external devices, external networks, external entities, etc. (individually and collectively referenced by reference number 328). For example, communication interface 324 may allow computer system 300 to communicate with external or remote devices 328 over communications path 326, which may be wired and/or wireless (or a combination thereof), and which may include any combination of LANs, WANs, the Internet, etc. Control logic and/or data may be transmitted to and from computer system 300 via communication path 326.

Computer system 300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 300 may be a client or server, accessing or hosting any applications and/or data through any delivery paradigm, including but not limited to remote or distributed cloud computing solutions; local or on-premises software ("on-premise" and/or cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
   receiving a request for an interface, wherein the request comprises a hypertext transfer protocol (HTTP) request;
   identifying a plurality of tiles for display on the interface associated with the HTTP request, wherein a first tile of the plurality of tiles is associated with sensitive data, and wherein a second tile of the plurality of tiles is associated with non-sensitive data;
   identifying an access profile associated with providing access to the sensitive data, wherein the access profile comprises one or more requirements, associated with the HTTP request, for providing access to the sensitive data via the interface;
   identifying request information in the HTTP request corresponding to the one or more requirements of the access profile;
   comparing the identified request information to the one or more requirements of the access profile;
   making a determination whether the identified request information satisfies the one more requirements of the access profile based on the comparing; and
   providing at least one of: the second tile or the first tile and the second tile for display on the interface based on the determination whether the identified request information satisfies the one or more requirements of the access profile associated with providing access to the sensitive data.

2. The method of claim 1, wherein the request is received from a browser of a computing device.

3. The method of claim 1, wherein the identifying the plurality of tiles comprises:
   identifying a user associated with the HTTP request; and
   identifying one or more roles or groups of tiles associated with the user.

4. The method of claim 1, wherein the access profile comprises a blacklist indicating one or more requirements, that if present in the HTTP request, restrict access to the sensitive data from the interface associated with the HTTP request.

5. The method of claim 1, wherein the access profile comprises a whitelist indicating one or more requirements, that if present in the HTTP request, grant access to the sensitive data from the interface associated with the HTTP request.

6. The method of claim 1, further comprising:
determining a set of one or more request features, which if present in the HTTP request, render the access inapplicable and for which the sensitive data is always accessible.

7. The method of claim 6, further comprising:
determining a set of one or more known internet protocol (IP) addresses corresponding to the set of one or more request features, for which the access profile is inapplicable and the sensitive data is always accessible;
determining a request IP address associated with the request for the interface; and
determining that the request IP address is not in the set of one or more known IP addresses.

8. The method of claim 6, further comprising:
determining that a cookie associated with a browser corresponds to the set of one or more request features, for which the access profile is inapplicable and the sensitive data is always accessible; and
determining that the cookie is not present in a browser associated with the HTTP request.

9. A system, comprising:
a memory; and
at least one processor coupled to the memory and configured to perform instructions that cause the at least one processor to perform operations comprising:
receiving a request for an interface, wherein the request comprises a hypertext transfer protocol (HTTP) request;
identifying a plurality of tiles for display on the interface associated with the HTTP request, wherein a first tile of the plurality of tiles is associated with sensitive data, and wherein a second tile of the plurality of tiles is associated with non-sensitive data;
identifying an access profile associated with providing access to the sensitive data, wherein the access profile comprises one or more requirements, associated with the HTTP request, for providing access to the sensitive data via the interface;
identifying request information in the HTTP request corresponding to the one or more requirements of the access profile;
comparing the identified request information to the one or more requirements of the access profile;
making a determination whether the identified request information satisfies the one or more requirements of the access profile based on the comparing; and
providing at least one of: the second tile or the first tile and the second tile for display on the interface based on the determination whether the identified request information satisfies the one or more requirements of the access profile associated with providing access to the sensitive data.

10. The system of claim 9, wherein the request is received from a browser of a computing device.

11. The system of claim 9, wherein the identifying the plurality of tiles comprises:
identifying a user associated with the HTTP request; and
identifying one or more roles or groups of tiles associated with the user.

12. The system of claim 9, wherein the access profile comprises a blacklist indicating one or more requirements, that if present in the HTTP request, restrict access to the sensitive data from the interface associated with the HTTP request.

13. The system of claim 9, wherein the access profile comprises a whitelist indicating one or more requirements, that if present in the HTTP request, grant access to the sensitive data from the interface associated with the HTTP request.

14. The system of claim 9, the operations further comprising:
determining a set of one or more request features, which if present in the HTTP request, render the access inapplicable and for which the sensitive data is always accessible.

15. The system of claim 14, the operations further comprising:
determining a set of one or more known internet protocol (IP) addresses corresponding to the set of one or more request features, for which the access profile is inapplicable and the sensitive data is always accessible;
determining a request IP address associated with the request for the interface; and
determining that the request IP address is not in the set of one or more known IP addresses.

16. The system of claim 14, the operations further comprising:
determining that a cookie associated with a browser corresponds to the set of one or more request features, for which the access profile is inapplicable and the sensitive data is always accessible; and
determining that the cookie is not present in a browser associated with the HTTP request.

17. A non-transitory computer-readable medium having instructions stored thereon that, when executed by at least one computing device, cause the at least one computing device to perform operations comprising:
receiving a request for an interface, wherein the request comprises a hypertext transfer protocol (HTTP) request;
identifying a plurality of tiles for display on the interface associated with the HTTP request, wherein a first tile of the plurality of tiles is associated with sensitive data, and wherein a second tile of the plurality of tiles is associated with non-sensitive data;
identifying an access profile associated with providing access to the sensitive data, wherein the access profile comprises one or more requirements, associated with the HTTP request, for providing access to the sensitive data via the interface;
identifying request information in the HTTP request corresponding to the one or more requirements of the access profile;
comparing the identified request information to the one or more requirements of the access profile;
making a determination whether the identified request information satisfies the one or more requirements of the access profile based on the comparing; and
providing at least one of: the second tile or the first tile and the second tile for display on the interface based on the determination whether the identified request information satisfies the one or more requirements of the access profile associated with providing access to the sensitive data.

18. The non-transitory computer-readable medium of claim 17, wherein the request is received from a browser of a computing device.

19. The non-transitory computer-readable medium of claim 17, wherein the identifying the plurality of tiles comprises:
   identifying a user associated with the HTTP request; and
   identifying one or more roles or groups of tiles associated with the user.

20. The non-transitory computer-readable medium of claim 17, wherein the access profile comprises a blacklist indicating one or more requirements, that if present in the HTTP request, restrict access to the sensitive data from the interface associated with the HTTP request.

\* \* \* \* \*